(12) United States Patent
Oda

(10) Patent No.: US 10,731,754 B2
(45) Date of Patent: Aug. 4, 2020

(54) OIL PRESSURE CONTROL DEVICE

(71) Applicant: AISIN SEIKI KABUSHIKI KAISHA, Kariya-shi, Aichi-ken (JP)

(72) Inventor: Naochika Oda, Novi, MI (US)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 16/295,457

(22) Filed: Mar. 7, 2019

(65) Prior Publication Data

US 2019/0277354 A1  Sep. 12, 2019

(30) Foreign Application Priority Data

Mar. 7, 2018  (JP) ................................. 2018-040997

(51) Int. Cl.
| | | |
|---|---|---|
| *F16H 61/06* | (2006.01) | |
| *F16D 48/06* | (2006.01) | |
| *F16D 48/02* | (2006.01) | |
| *F16H 61/00* | (2006.01) | |

(Continued)

(52) U.S. Cl.
CPC ........... *F16H 61/061* (2013.01); *F16D 25/14* (2013.01); *F16D 48/062* (2013.01); *F16H 59/46* (2013.01); *F16H 61/0021* (2013.01); *F16D 2500/1026* (2013.01); *F16D 2500/30406* (2013.01); *F16D 2500/30415* (2013.01); *F16D 2500/70406* (2013.01); *F16H 3/666* (2013.01); *F16H 2059/465* (2013.01); *F16H 2200/0052* (2013.01); *F16H 2200/201* (2013.01); *F16H 2200/2043* (2013.01)

(58) Field of Classification Search
CPC ............... F16H 2061/062; F16H 61/08; F16H 2059/465; F16D 25/14; F16D 48/06–48/066
See application file for complete search history.

(56) References Cited

U.S. PATENT DOCUMENTS 6,073,071 A * 6/2000 Yasue ................... F16H 61/061
477/143
8,725,373 B2 * 5/2014 Tsutsui ................ F16H 61/0437
192/3.3
9,933,069 B2 * 4/2018 Yanakiev .............. F16H 61/061

FOREIGN PATENT DOCUMENTS

| JP | 2011185430 A | 9/2011 |
|---|---|---|
| JP | 2013032793 A | 2/2013 |

* cited by examiner

*Primary Examiner* — Erin D Bishop
(74) *Attorney, Agent, or Firm* — Buchanan Ingersoll & Rooney PC

(57) ABSTRACT

An oil pressure control device applied to an oil pressure device includes a calculation unit that estimates a delay of an actual oil pressure actually supplied from an oil pressure circuit to a friction engagement element of the oil pressure device with respect to an instruction pressure that instructs an oil pressure to be supplied from the oil pressure circuit to the friction engagement element, and calculates an estimated actual oil pressure obtained by taking the estimated delay of the actual oil pressure into consideration, a determination unit that determines whether a slip amount that occurs in the friction engagement element in an intermediate state between an engagement state and a disengagement state reaches a predetermined reference slip amount, and a setting unit that sets the estimated actual oil pressure as the instruction pressure when the determination unit determines that the slip amount reaches the reference slip amount.

4 Claims, 9 Drawing Sheets

(51) Int. Cl.
*F16H 59/46* (2006.01)
*F16H 3/66* (2006.01)

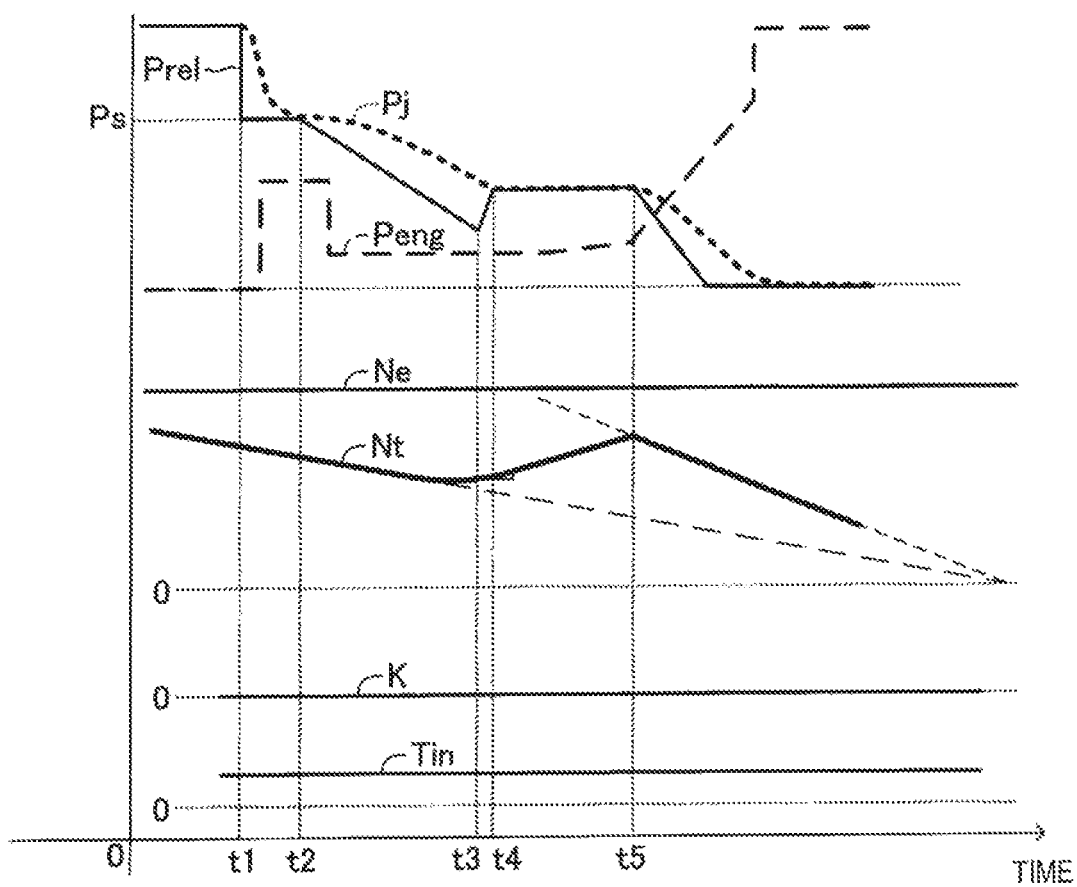

OIL PRESSURE CONTROL DEVICE

CROSS REFERENCE TO RELATED APPLICATIONS

This application is based on and claims priority under 35 U.S.C. § 119 to Japanese Patent Application 2018-040997, filed on Mar. 7, 2018, the entire contents of which are incorporated herein by reference.

TECHNICAL FIELD

This disclosure relates to an oil pressure control device.

BACKGROUND DISCUSSION

A control device for a continuously variable speed change machine disclosed in JP-A-2011-185430 (Reference 1) described below, for example, has been known in the related art. In the related control device, when a sudden speed change is required, an electronic control device calculates an instruction oil pressure obtained by adding a correction value that offsets an oil pressure response delay with respect to a target oil pressure, and outputs a drive command corresponding to the calculated instruction oil pressure to an oil pressure control unit.

In this regard, in the related control device described above, the instruction oil pressure obtained by adding the correction value that offsets the oil pressure response delay is calculated. However, in the related control device described above, in a case where the instruction pressure obtained by adding the correction value is applied at the start of a slip and an actual oil pressure generated in response to the instruction pressure overshoots, heat generation due to excessive slip amount occurs, and complete disengagement and re-engagement of a friction engagement element are repeated and an unnecessary shock occurs.

Thus, a need exists for an oil pressure control device which is not susceptible to the drawback mentioned above.

SUMMARY

An oil pressure control device according to an aspect of this disclosure, which is applied to an oil pressure device for controlling oil pressure supplied from an oil pressure circuit to a friction engagement element. The oil pressure device includes: an input shaft; an output shaft; the friction engagement element disposed between the input shaft and the output shaft, and configured to enable transmission of rotational power, which is input from a power source to the input shaft, to the output shaft by being in an engagement state, and to block the transmission of the rotational power to the output shaft by being in a disengagement state; and the oil pressure circuit configured to supply the oil pressure to the friction engagement element, in which the friction engagement element is capable of transiting between the engagement state and the disengagement state by the oil pressure supplied from the oil pressure circuit. The oil pressure control device includes: a calculation unit configured to calculate and estimate a delay of an actual oil pressure actually supplied from the oil pressure circuit to the friction engagement element with respect to an instruction pressure that instructs the oil pressure to be supplied from the oil pressure circuit to the friction engagement element, and to calculate an estimated actual oil pressure obtained by taking the estimated delay of the actual oil pressure into consideration; a determination unit configured to determine whether a slip amount that occurs in the friction engagement element in an intermediate state between the engagement state and the disengagement state reaches a predetermined reference slip amount so as to enable relative rotation between the input shaft and the output shaft; and a setting unit configured to set the estimated actual oil pressure calculated by the calculation unit as the instruction pressure when the determination unit determines that the slip amount reaches the reference slip amount.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a diagram showing an operation state of clutches and brakes in each speed change stage of the automatic transmission of FIG. 2;

FIG. 4 is a time chart schematically showing operations of the vehicle including the oil pressure control device during downshift;

DETAILED DESCRIPTION

Figure 1:
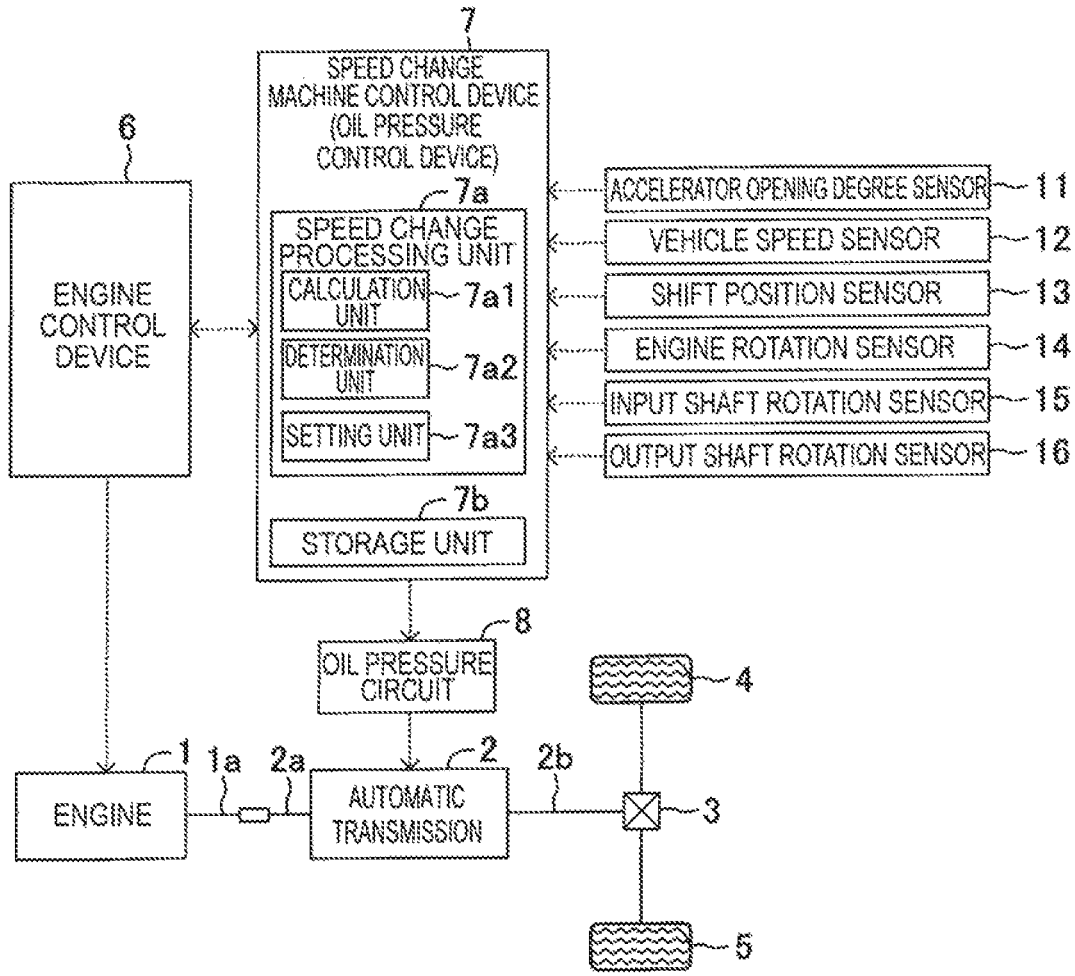
FIG. 1 is a block diagram schematically showing a configuration of a vehicle including an oil pressure control device (speed change machine control device) in an embodiment.

Hereinafter, an embodiment disclosed here will be described with reference to the drawings. In the following embodiment and each of modifications, the same or equivalent portions are denoted by the same reference numerals in the drawings. Further, the drawings used in the description are conceptual diagrams, and the shape of each part is not necessarily precise.

A vehicle including an oil pressure control device according to the present embodiment includes an engine 1 as a power source, a vehicle automatic transmission 2 as an oil pressure device in a power transmission path between a drive wheel 4 and a drive wheel 5 (hereinafter, the vehicle automatic transmission 2 is referred to simply as an automatic transmission 2), and a differential gear 3. The vehicle includes the engine 1, the automatic transmission 2, the differential gear 3, the drive wheels 4 and 5, an engine control device 6, a speed change machine control device 7 as the oil pressure control device, an oil pressure circuit 8, an accelerator opening degree sensor 11, a vehicle speed sensor 12, a shift position sensor 13, an engine rotation sensor 14, an input shaft rotation sensor 15, and an output shaft rotation sensor 16. The vehicle using only the engine 1 as the power source is shown in FIG. 1, and the present invention is also applicable to a vehicle using an engine and a motor as the power source, a hybrid vehicle using an engine and a motor as the power source, or an electric vehicle using only a motor as the power source.

The engine 1 is an internal combustion engine (power source) in which fuel in a cylinder is exploded to output rotational power from the generated thermal energy, and includes an injector actuator (not shown) that adjusts an injection amount of the fuel, and an igniter actuator (not shown) that adjusts ignition timing of the fuel. The rotational power of the engine 1 is transmitted to the automatic transmission 2 via a crankshaft 1a. The engine 1 is communicably connected to and controlled by the engine control device 6.

Figure 2:
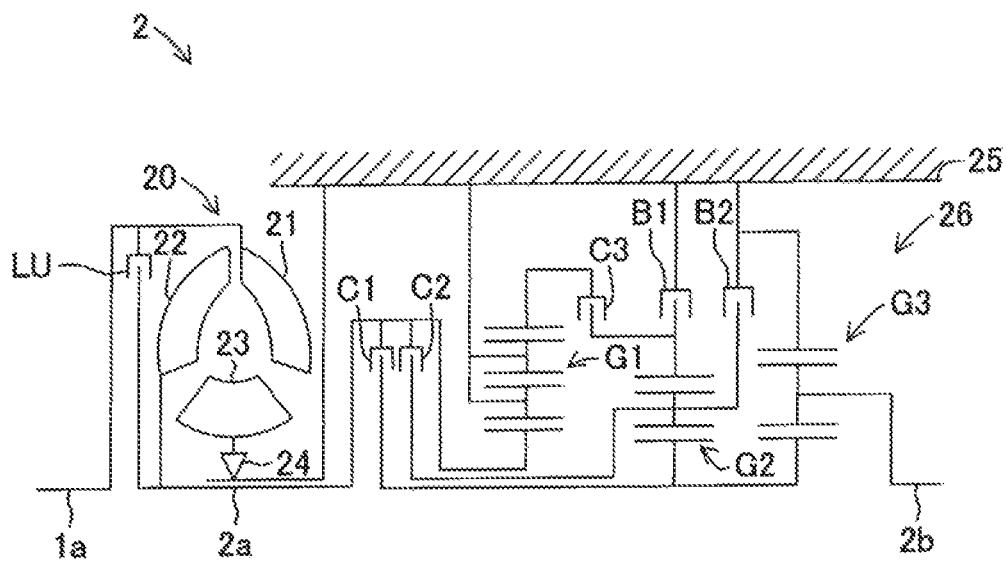
FIG. 2 is a skeleton diagram schematically showing an automatic transmission of FIG. 1.

The automatic transmission 2 as the oil pressure device is a mechanism that transmits the rotational power output from the engine 1 to the differential gear 3 after speed being changed by a speed change machine 26. As shown in FIG. 2, in the automatic transmission 2, the rotational power output from the engine 1 serving as the power source via the crankshaft 1a is input to the speed change machine 26 via a torque converter 20 serving as a fluid transmission device, and the rotational power input to the speed change machine 26 is output to the differential gear 3 after speed being changed. The automatic transmission 2 includes a lock-up clutch LU that detachably engages a pump impeller 21 and a turbine runner 22 in the torque converter 20, a plurality of clutches, that is, a clutch C1, a clutch C2, and a clutch C3, that detachably engage predetermined rotational elements of a planetary gear G1, a planetary gear G2 and a planetary gear G3 in the speed change machine 26, and a plurality of brakes, that is, a brake B1 and a brake B2, that stop rotation of the predetermined rotational elements of the planetary gears G1, G2, and G3 in the speed change machine. The automatic transmission 2 is connected through an oil passage to the oil pressure circuit 8 that selectively performs oil pressure operation on the clutch LU, the clutches C1, C2, and C3, and the brakes B1 and B2. In this embodiment, the clutches C1, C2, and C3 and the brakes B1, and B2 are referred to as "friction engagement element".

Here, the torque converter 20 is the fluid transmission device that uses hydrodynamic actions of fluid and generates a torque amplification effect by using a rotation difference between the pump impeller 21 that rotates integrally with an input shaft to which the rotational power from the crankshaft 1a is input and the turbine runner 22 that rotates integrally with an output shaft from which the rotational power is output toward an input shaft 2a of the speed change machine 26. The torque converter 20 is disposed on a power transmission path between the crankshaft 1a of the engine 1 and the input shaft 2a of the speed change machine 26. The torque converter 20 includes the pump impeller 21, the turbine runner 22, a stator 23, a one-way clutch 24, a housing 25, and the lock-up clutch LU.

The pump impeller 21 is an impeller that sends oil toward the turbine runner 22 by rotating, and rotates integrally with the crankshaft 1a of the engine 1. The turbine runner 22 is an impeller that rotates by receiving the oil sent from the pump impeller 21. The turbine runner 22 rotates integrally with the input shaft 2a of the speed change machine 26. The turbine runner 22 can rotate relative to the pump impeller 21, and can rotate integrally with the pump impeller 21 when the lock-up clutch LU is engaged.

The stator 23 is an impeller disposed at a position near an inner circumference between the turbine runner 22 and the pump impeller 21, rectifying and refluxing the oil discharged from the turbine runner 22 to the pump impeller 21 so as to generate the torque amplification effect. The stator 23 is fixed to the housing 25 via the one-way clutch 24, and configured to rotate only in one direction. The stator 23 is fixed to a rotational end of the one-way clutch 24. A fixed end of the one-way clutch 24 is fixed to the housing 25.

The housing 25 is a member that houses the speed change machine 26 and is fixed to a vehicle body (not shown). The lock-up clutch LU is a clutch mechanism that directly connects the pump impeller 21 and the turbine runner 22 when a difference in rotational speed therebetween is small, and eliminates a difference in rotational speed between the crankshaft 1a of the engine 1 and the input shaft 2a of the speed change machine 26. The lock-up clutch LU transmits the rotational power of the crankshaft 1a to the input shaft 2a by engaging. The lock-up clutch LU is in an engagement state when an oil pressure from the oil pressure circuit 8 is high, and is in a disengagement state when the oil pressure from the oil pressure circuit 8 is low.

As shown in FIG. 2, the speed change machine 26 is a gear mechanism that transmits the rotational power of the input shaft 2a to an output shaft 2b after speed being changed. The speed change machine 26 includes the planetary gears G1, G2, and G3 in the power transmission path between the input shaft 2a and the output shaft 2b, as described above.

The planetary gear G1 is a double-pinion planetary gear. The planetary gear G1 includes a sun gear that rotates integrally with the input shaft 2a, a ring gear that is disposed on an outer periphery of the sun gear, a first pinion gear that revolvably meshes with the sun gear on the outer periphery of the sun gear, a second pinion gear that revolvably meshes with the ring gear on an inner periphery of the ring gear, and a carrier that rotatably supports the first pinion gear and the second pinion gear and is fixed to the housing 25.

The planetary gear G2 is a single-pinion planetary gear. The planetary gear G2 includes a sun gear that detachably rotates with the input shaft 2a via the clutch C1, a ring gear that is disposed on an outer periphery of the sun gear, detachably rotates with the ring gear of the planetary gear G1 via the clutch C3, and is detachably fixed to the housing 25 via the brake B1, a pinion gear that revolvably meshes with the sun gear and the ring gear between the sun gear and the ring gear, and a carrier that rotatably supports the pinion gear, detachably rotates with the input shaft 2a via the clutch C2, and is detachably fixed to the housing 25 via the brake B1.

The planetary gear G3 is a single-pinion planetary gear. Planetary gear G3 includes a sun gear that detachably rotates with the input shaft 2a via the clutch C1, a ring gear that is disposed on an outer periphery of the sun gear and fixed to the housing 25, a pinion gear that revolvably meshes with the sun gear and the ring gear between the sun gear and the ring gear, and a carrier that rotatably supports the pinion gear and rotates integrally with the output shaft 2b.

As shown in FIG. 3, the speed change machine 26 switches a speed change stage by selecting the engagement state or the disengagement state of the clutches C1, C2, and C3, and the brakes B1, and B2, which are the friction engagement elements. The clutches C1 to C3 and the brakes B1 and B2 are in the engagement state when the oil pressure supplied from the oil pressure circuit 8 is high, and are in the disengagement state when the oil pressure supplied from the oil pressure circuit 8 is low. In FIG. 3, a circle indicates the engagement state, and a blank indicates the disengagement state. Here, the clutches C1 to C3 and the brakes B1 and B2 enable transmission of the rotational power by being in the engagement state, and cut off the transmission of the rotational power by being in the disengagement state. The clutches C1 to C3 and the brake B1 and B2 are capable of transiting to the engagement state or the disengagement state, or to an intermediate state between the engagement state and the disengagement state by the oil pressure supplied from the oil pressure circuit 8.

The speed change machine 26 includes one speed change stage for a reverse travel, and six speed change stages for a forward travel. The speed change stages include the reverse travel and speeds from a first speed to a sixth speed for the forward travel. The first speed is implemented when the clutch C1 and the brake B2 are in the engagement state and the clutches C2 and C3 and the brake B1 are in the disengagement state. The second speed is implemented when the clutch C1 and the brake B1 are in the engagement state and the clutches C2 and C3 and the brake B2 are in the disengagement state. The third speed is implemented when the clutches C1 and C3 are in the engagement state and the clutch C2 and the brakes B1 and B2 are in the disengagement state. The fourth speed is implemented when the clutches C1 and C2 are in the engagement state and the clutch C3 and the brakes B1 and B2 are in the disengagement state. The fifth speed is implemented when the clutches C2 and C3 are in the engagement state and the clutch C1 and the brakes B1 and B2 are in the disengagement state. The sixth speed is implemented when the clutch C2 and the brake B1 are in the engagement state and the clutches C1 and C3 and the brake B2 are in the disengagement state. Further, the reverse travel is implemented when the clutch C3 and the brake B2 are in the engagement state, and the clutches C1 and C2 and the brake B1 are in the disengagement state.

The differential gear 3 is a device that differentially drives the drive wheels 4 and 5 by using the rotational power from the output shaft 2b of the automatic transmission 2. The drive wheels 4 and 5 are front or rear wheels of the vehicle to which the rotational power from the differential gear 3 is transmitted.

The engine control device 6 is a computer that controls operations of the engine 1. The engine control device 6 is communicably connected to various actuators, various sensors, and switches (none of which are shown) in the engine 1. The engine control device 6 is also communicably connected to the speed change machine control device 7, and exchanges data and signals with the speed change machine control device 7. The engine control device 6 performs control processing of the engine 1 based on a predetermined program (including a database, a map or the like) in response to signals from various sensors, switches, or the speed change machine control device 7.

The speed change machine control device 7 serving as the oil pressure control device is a computer that controls operations of the automatic transmission 2. The speed change machine control device 7 is communicably connected to various actuators (e.g., a solenoid not shown) in the oil pressure circuit 8, and various sensors 11 to 16 to be described below. The speed change machine control device 7 is communicably connected to the engine control device 6, and exchanges data and signals with the engine control device 6. The speed change machine control device 7 includes a speed change processing unit 7a and a storage unit 7b.

The speed change processing unit 7a has a microcomputer including a CPU, a ROM, a RAM, a timer, and various interfaces (none of which are shown) as a main component. The speed change processing unit 7a performs control processing of the automatic transmission 2 together with the storage unit 7b by executing various programs (including database, a map or the like) including a speed change control program to be described below.

The speed change processing unit 7a performs speed change control processing on the automatic transmission 2 via the oil pressure circuit 8. When operating in a manual speed change mode by a shift lever (not shown), the speed change processing unit 7a performs speed change control based on signals from the shift position sensor 13. When the shift lever is in an automatic speed change mode, the speed change processing unit 7a performs the speed change control processing of the automatic transmission 2 according to a throttle opening degree and a vehicle speed based on a speed change line stored in the storage unit 7b. The speed change processing unit 7a performs the speed change processing to upshift when an actual vehicle speed (vehicle speed detected by the vehicle speed sensor 12) at an actual throttle opening degree (throttle opening degree K detected by the accelerator opening degree sensor 11) is greater than or equal to a vehicle speed corresponding to the actual throttle opening degree of an upshift side speed change line (n→n+1). Further, the speed change processing unit 7a performs the speed change processing to downshift when the actual vehicle speed at the actual throttle opening degree is less than or equal to a vehicle speed corresponding to an actual accelerator circuit of a downshift side speed change line (n→n−1), and maintains a current speed change stage when the actual vehicle speed at the actual throttle opening degree is a vehicle speed between the speed change lines (n→n+1, n→n−1).

The speed change processing unit 7a includes a calculation unit 7a1, a determination unit 7a2, and a setting unit 7a3. The calculation unit 7a1 calculates and estimates a delay of an actual oil pressure Pj supplied from the oil pressure circuit 8 to the friction engagement element (e.g., the brake B1) with respect to an instruction pressure (e.g., disengagement instruction pressure Prel to be described below) that instructs an oil pressure to be supplied from the oil pressure circuit 8 to the friction engagement elements (the clutches C1 to C3 and the brakes B1 and B2), and calculates an estimated actual oil pressure Pes obtained by taking the estimated delay of the actual oil pressure Pj into consideration as will be described in detail below. The determination unit 7a2 determines whether a slip amount A that occurs in the friction engagement element (e.g., the brake B1) in the intermediate state between the engagement state and the disengagement state reaches a predetermined reference slip amount As so as to enable relative rotation occur between the input shaft 2a and the output shaft 2b. The setting unit 7a3 sets the estimated actual oil pressure Pes calculated by the calculation unit 7a1 as the instruction pressure (e.g., disengagement instruction pressure Prel)

when the determination unit 7a2 determines that the slip amount A reaches the reference slip amount As.

The storage unit 7b stores predetermined information such as a speed change map, a program, a calculation result described below or the like. In response to a request from the speed change processing unit 7a, the storage unit 7b provides information corresponding to the request to the speed change processing unit 7a.

The oil pressure circuit 8 is a circuit that adjusts, in response to control of the speed change machine control device 7, an oil passage and an oil pressure of hydraulic oil introduced from an oil pump (not shown), and outputs the hydraulic oil to a selected friction engagement element (the clutches C1 to C3, the brakes B1 and B2) including the lock-up clutch LU in the automatic transmission 2. The oil pressure circuit 8 includes various valves such as a solenoid valve that switches the oil passage or adjusts the oil pressure. The oil pressure circuit 8 is communicably connected to and controlled by the speed change machine control device 7.

The accelerator opening degree sensor 11 is a sensor that detects the throttle opening degree K with respect to an operation amount of an accelerator pedal (including an accelerator lever) not shown in the drawing. The vehicle speed sensor 12 is a sensor that detects a speed of the vehicle. The shift position sensor 13 is a sensor that detects an operation position (parking P, neutral N, drive D, upshift +, downshift −) of the shift lever. The engine rotation sensor 14 is a sensor that detects an engine rotation number Ne of the engine 1 (the crankshaft 1a). The input shaft rotation sensor 15 is a sensor that detects an input shaft rotation number Nt of the input shaft 2a (the turbine runner 22 of the torque converter 20) in the automatic transmission 2. The output shaft rotation sensor 16 is a sensor that detects an output shaft rotation number No of the output shaft 2b in the automatic transmission 2. Each of the sensors 11 to 16 is communicably connected to the speed change machine control device 7.

In the configuration described above, the speed change processing unit 7a of the speed change machine control device 7 performs the following control processing in downshift-related speed change processing, for example, when a downshift speed change (coast down speed change) is performed during deceleration coasting in a state where the accelerator pedal is not depressed. Specifically, the speed change processing unit 7a determines whether the vehicle is during coast down (during the deceleration coasting in the state where the accelerator pedal is not depressed) based on signals from the accelerator opening degree sensor 11 and the vehicle speed sensor 12. In a case where the vehicle is during the coast down, the speed change processing unit 7a determines whether a speed change control transition condition (the actual vehicle speed is less than or equal to a vehicle speed (speed change point) corresponding to the actual throttle opening degree K "0%" of the downshift side speed change line (n→n−1)) is established.

In a case where the speed change control transition condition is established, the speed change processing unit 7a performs control (disengagement ramp control) to gradually (at a predetermined speed) lower an oil pressure (hereinafter, a disengagement oil pressure is referred to as a "disengagement instruction pressure") instructed by the solenoid valve in the oil pressure circuit 8 in which an oil pressure with respect to the brake B1, which is the friction engagement element to be disengaged specifically, is operated when the downshift is performed from the second speed to the first speed. Meanwhile, the speed change processing unit 7a performs control (pre-charge control) to increase the oil pressure (hereinafter, an engagement oil pressure is referred to as an "engagement instruction pressure") instructed by the solenoid valve in the oil pressure circuit 8 in which an oil pressure with respect to the brake B2, which is the friction engagement element to be engaged specifically, is operated when the downshift is performed from the second speed to the first speed, to a standby pressure.

Subsequently, based on the input shaft rotation number Nt that is a signal from the input shaft rotation sensor 15 and the output shaft rotation number No that is a signal from the output shaft rotation sensor 16, the speed change processing unit 7a determines whether the slip amount A that occurs when the brake B1 serving as the friction engagement element to be disengaged is in the intermediate state between the engagement state and the disengagement state enabling the relative rotation between the input shaft 2a and the output shaft 2b reaches the predetermined reference slip amount As. In the slip determination, if the slip amount A (=Nt−(No×r)) is greater than a slip determination rotation number Ns corresponding to the reference slip amount As serving as a preset predetermined value, the speed change processing unit 7a determines that the predetermined reference slip amount As occurs in the brake B1 that is the friction engagement element. The slip amount A (=Nt−(No×r)) is a value obtained by: subtracting a value (=No×r) obtained by multiplying the output shaft rotation number No by a gear ratio r before speed change (speed reduction ratio), that is, the (No×r) being a rotation number of the input shaft 2a estimated from the output shaft rotation number No, from the actual input shaft rotation number Nt detected by the input shaft rotation sensor 15.

When determining that the reference slip amount As occurs, the speed change processing unit 7a determines, based on the input shaft rotation number Nt input from the input shaft rotation sensor 15 and the output shaft rotation number No input from the output shaft rotation sensor 16, whether Nt/No>a predetermined value, that is, whether a state where a ratio between the input shaft rotation number Nt and the output shaft rotation number No is greater than the gear ratio before the downshift and is less than the gear ratio after the downshift is satisfied. In a case where the ratio (Nt/No) is greater than the predetermined value, the speed change processing unit 7a performs the control (engagement ramp control) to gradually (at a predetermined speed) increase the engagement instruction pressure.

Then, based on the input shaft rotation number Nt input from the input shaft rotation sensor 15 and the output shaft rotation number No input from the output shaft rotation sensor 16, the speed change processing unit 7a determines whether the brake B2 that is the friction engagement element to be engaged is synchronized (Nt/No=the gear ratio after speed change). In a case where the brake B2 that is the friction engagement element to be engaged is synchronized, the speed change processing unit 7a performs control to maintain a rotation number of the engine 1 at an idling rotation number (the throttle opening degree K is maintained at 0%) via the engine control device 6, and performs control (the disengagement ramp control) to gradually (at a predetermined speed) decrease the disengagement instruction pressure. The speed change processing unit 7a determines whether the engagement ramp control of the engagement instruction pressure and the disengagement ramp control of the disengagement instruction pressure are completed. When the controls are completed, the processing ends.

When the speed change control transition condition is established, for example, in a case where the brake B1 that is the friction engagement element to be disengaged is subjected to the disengagement ramp control when the downshift is performed from the second speed to the first speed, as indicated by a solid line in FIG. 4, the speed change processing unit 7a maintains a standby instruction pressure Ps until time t2 after decreasing to the disengagement instruction pressure Prel (hereinafter, the disengagement instruction pressure Prel is referred to as a "standby instruction pressure Ps") at time t1 by a first pressure reduction amount D1. Thereafter, the speed change processing unit 7a gradually (at a predetermined speed) decreases the disengagement instruction pressure Prel until time t3 from the standby instruction pressure Ps by a second pressure reduction amount D2 smaller than the first pressure decrease amount D1. Then, the disengagement instruction pressure Prel is temporarily increased at time t4 at which the slip amount A (=Nt−(No×r)) of the brake B1 reaches the predetermined reference slip amount As, and then the increased disengagement instruction pressure Prel is maintained until time t5.

As indicated by a thick broken line in FIG. 4, the actual oil pressure Pj in the brake B1 corresponding to the disengagement instruction pressure delays with respect to the disengagement instruction pressure Prel indicated by the solid line, in other words, changes with a time constant. That is, an oil pressure delay of the actual oil pressure Pj with respect to the disengagement instruction pressure Prel that is the instruction pressure, is represented by a transmission function shown in the following Equation 1.

$$\frac{\text{Actual oil pressure}}{\text{Instruction oil pressure}} = \frac{1}{T_{oil} \times s + 1} \qquad \text{Equation 1}$$

In Equation 1, "$T_{oil}$" represents a time constant of the oil pressure delay, and "s" represents a Laplace operator.

Accordingly, the actual oil pressure Pj in the brake B1 generates the oil pressure delay represented by the transmission function indicated in Equation 1, in other words, by a first-order delay filter, with respect to the disengagement instruction pressure Prel (the instruction pressure). Such an oil pressure delay of the actual oil pressure Pj may influence speed change operations in the automatic transmission 2.

As described above, for example, in a case where the downshift is performed from the second speed to the first speed in the coast down speed change, the disengagement instruction pressure Prel in the brake B1 that is the friction engagement element changes so as to temporarily increase at the time t4. In this case, as shown in FIG. 4, in a case where the increased disengagement instruction pressure Prel coincides with the actual oil pressure Pj at the time t4, the reference slip amount As that occurs in the brake B1 is appropriately maintained at the time t4, and the input shaft rotation number Nt of the input shaft 2a can be smoothly changed from a rotation number corresponding to the second speed before the speed change to a rotation number corresponding to the first speed after the speed change, that is, the speed change (downshift) can be smoothly performed.

Figure 5:
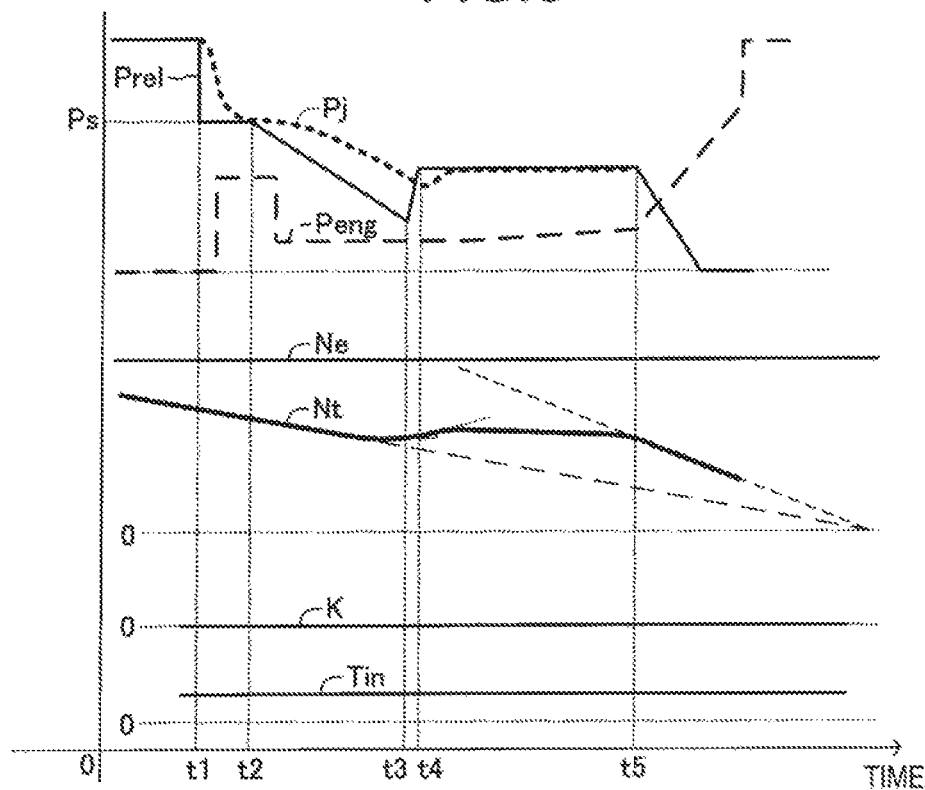
FIG. 5 is a time chart schematically showing operations of the vehicle in a case where an actual oil pressure is lower than an instruction pressure.

On the contrast, as shown in FIG. 5, in a case where the actual oil pressure Pj indicated by the broken line is lower than the increased disengagement instruction pressure Prel at the time t4, in other words, in a case where the disengagement instruction pressure Prel is higher than the actual oil pressure Pj, the reference slip amount As that occurs in the brake B1 cannot be appropriately maintained at the time t4. As a result, a change in the input shaft rotation number Nt from the rotation number corresponding to the second speed before the speed change to the rotation number corresponding to the first speed after the speed change stagnates, thereby leading to a situation where the speed change (downshift) stagnates.

Figure 6:
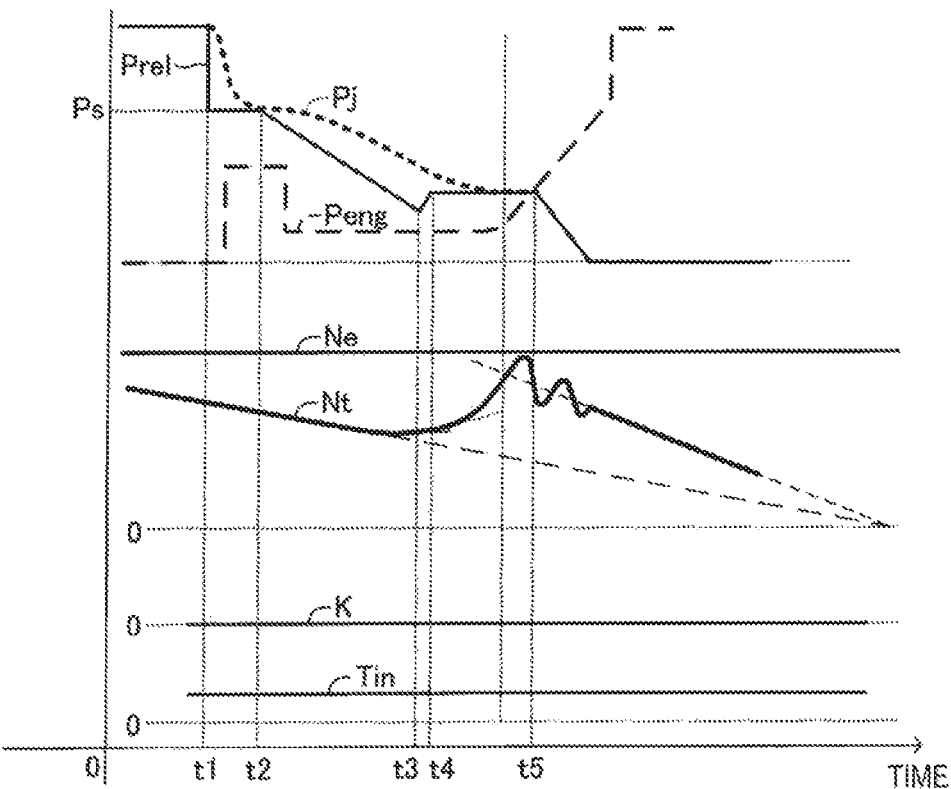
FIG. 6 is a time chart schematically showing operations of the vehicle in a case where the actual oil pressure is higher than the instruction pressure.

On the other hand, as shown in FIG. 6, in a case where the actual oil pressure Pj indicated by the broken line is higher than the increased disengagement instruction pressure Prel at the time t4, in other words, in a case where the disengagement instruction pressure Prel is lower than the actual oil pressure Pj, the slip amount A (the reference slip amount As) that occurs in the brake B1 increases at the time t4, and thus so-called racing occurs. As a result, the input shaft rotation number Nt oscillates when the rotation number corresponding to the second speed before the speed change is changed to the rotation number corresponding to the first speed after the speed change, and thus a speed change shock occurs in the speed change (downshift).

Therefore, in order to smoothly complete the speed change while appropriately maintaining the slip amount A (the reference slip amount As) that occurs in the brake B1 that is the friction engagement element as shown in FIG. 4, the speed change processing unit 7a needs to determine magnitude of the disengagement instruction pressure Prel such that the disengagement instruction pressure Prel coincides with the decreasing actual oil pressure Pj with the oil pressure delay. In this case, the speed change processing unit 7a can make the magnitude of the disengagement instruction pressure Prel coincide with the actual oil pressure Pj by detecting the actual oil pressure Pj. However, it is not practical since detection of the actual oil pressure Pj in the brake B1 makes a device complicated.

Therefore, the speed change processing unit 7a determines the time constant $T_{oil}$ of the oil pressure delay based on the transmission function derived as described below and established between transmission torque generated in response to the instruction pressure and a rotation number related to the transmission torque, and calculates the estimated actual oil pressure Pes estimated from the actual oil pressure Pj by using the transmission function of Equation 1. Then, the speed change processing unit 7a sets the estimated actual oil pressure Pes at the moment when the predetermined reference slip amount As occurs (e.g., at the time t4 described above) as the instruction pressure (the disengagement instruction pressure Prel).

A relationship indicated by the following Equation 2 is established between the transmission torque generated in response to the instruction pressure (the disengagement instruction pressure Prel and an engagement instruction pressure Peng) and the rotation number (the input shaft rotation number Nt of the input shaft 2a (the turbine runner 22)).

$$\Delta Nt \times \text{Int} = T\text{in} + T\text{rel} + T\text{eng} \qquad \text{Equation 2}$$

"$\Delta Nt$" on a left side of Equation 2 represents rotational acceleration of the input shaft 2a (the turbine runner 22), and "Int" represents input-side equivalent inertia of an input side (the input shaft 2a and the turbine runner 22) of the automatic transmission 2. "Tin" on a right side of Equation 2 represents input torque input to the input shaft 2a (the turbine runner 22), "Trel" represents transmission torque calculated from the disengagement instruction pressure Prel with respect to the brake B1, and "Teng" represents transmission torque calculated from the engagement instruction pressure Peng with respect to the brake B2.

Here, when the transmission torque Teng is set to "0" and the input torque Tin is set to a fixed value, Equation 2 can be indicated by the following equation 3.

$$\Delta Nt \times \text{Int} = T\text{in} + T\text{rel} \qquad \text{Equation 3}$$

When Equation 3 is transformed by using the Laplace operator s, the following Equation 4 is established.

$$\frac{Nt}{Trel} = \frac{1}{Int \times s} \qquad \text{Equation 4}$$

In addition, a following equation 5 using the time constant $T_{oil}$ is established based on Equation 1.

$$\frac{Trel}{Prel} = \frac{1}{T_{oil} \times s + 1} \qquad \text{Equation 5}$$

Therefore, the transmission function, which sets control input as the disengagement instruction pressure Prel and sets control output as the input shaft rotation number Nt of the input shaft 2a, can be represented by a following equation 6 obtained by multiplying Equation 4 and Equation 5.

$$\frac{Nt}{Prel} = \frac{1}{Int \times s} \times \frac{1}{T_{oil} \times s + 1} = \frac{1}{T_{oil} \times Int \times s^2 + Int \times s} \qquad \text{Equation 6}$$

A following equation 7 is established according to Equation 6 when the transmission function from the disengagement instruction pressure Prel to the input shaft rotation number Nt is system-identified by using, for example, the turbine runner 22 connected to the input shaft 2a. Here, upon system identification, a target turbine rotation number of the turbine runner 22 is set as the control input, a turbine rotation number (i.e., the input shaft rotation number Nt) of the turbine runner 22 is set as a control amount, and a numerical value proportional to a deviation between the target turbine rotation number and the turbine rotation number is set as the instruction pressure.

$$Sys(s) = \frac{1}{A \times s^2 + B \times s} \qquad \text{Equation 7}$$

"A" in Equation 7 is represented by a following equation 8, and "B" in Equation 7 is represented by a following equation 9.

$$A = T_{oil} \times \text{Int} \qquad \text{Equation 8}$$

$$B = \text{Int} \qquad \text{Equation 9}$$

In a case where Equation 7 can be obtained, an oil pressure response delay, that is, the time constant $T_{oil}$ can be calculated according to the following Equation 10 from Equation 8 and Equation 9.

$$T_{oil} = \frac{A}{B} \qquad \text{Equation 10}$$

The time constant $T_{oil}$ can be calculated by using Equation 10, so that the estimated actual oil pressure Pes can be calculated by estimating the actual oil pressure Pj according to Equation 1. Accordingly, even when it is difficult to measure the actual oil pressure Pj, the estimated actual oil pressure Pes can be easily calculated by using the input shaft rotation number Nt of the input shaft 2a and the turbine runner 22 that can be easily measured. In the automatic transmission 2, for example, an oil pressure in the oil passage disposed in the automatic transmission 2 can be measured for experiment and evaluation at the time of development. However, in this case, the measured oil pressure is measured in the middle of the oil passage, and does not necessarily coincide with an oil pressure applied to a friction material of the friction engagement elements (the clutches C1 to C3, and the brakes B1 and B2). Therefore, the time constant the $T_{oil}$ pressure delay can be calculated according to Equation 10, and the estimated actual oil pressure Pes can be calculated according to Equation 1, so that an oil pressure in the friction engagement element (e.g., the brakes B1 and B2) can be accurately estimated.

Figure 7:
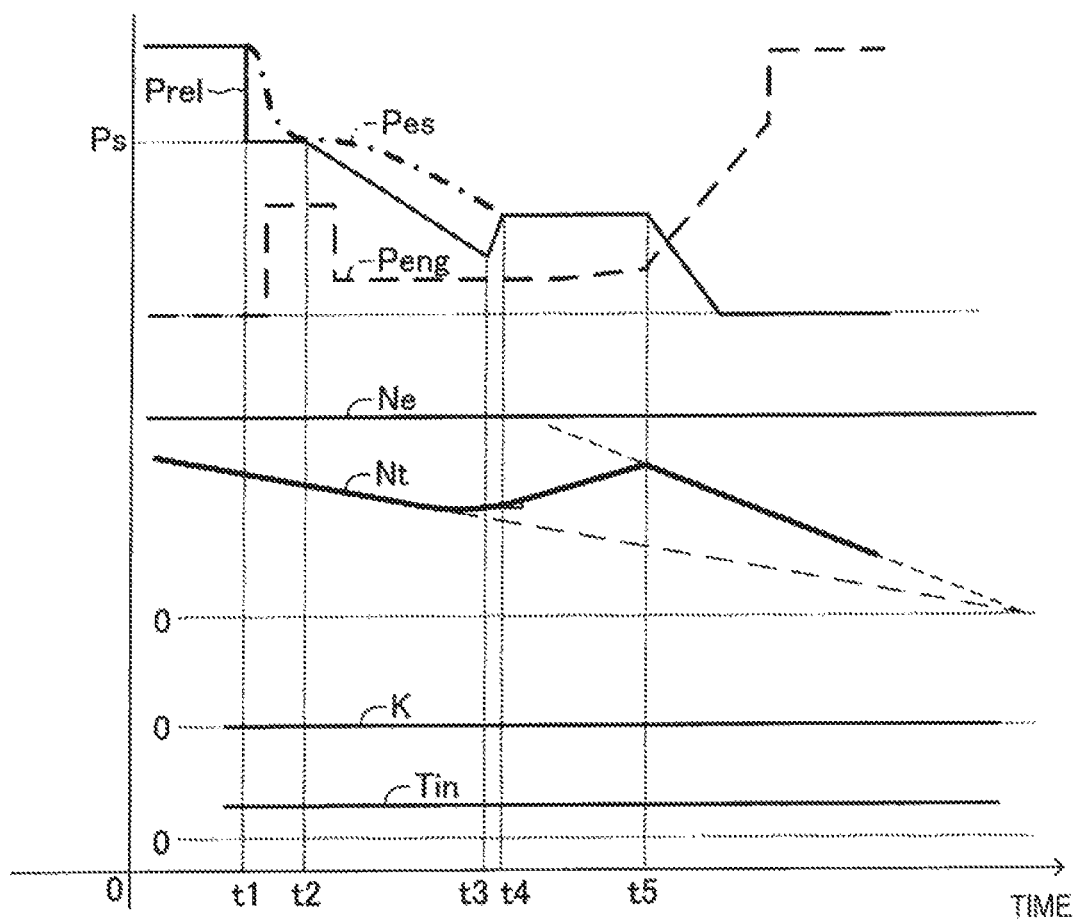
FIG. 7 is a time chart schematically showing operations of the vehicle in a case where an estimated actual oil pressure obtained by estimating the actual oil pressure is used.

In a case where the downshift is performed from the second speed to the first speed in the coast down speed change, the calculation unit 7a1 of the speed change processing unit 7a calculates the estimated actual oil pressure Pes in the brake B1 that is the friction engagement element, as indicated by a one-dot chain line in FIG. 7, by using the transmission function of a first-order delay calculated according to Equation 1, that is, the first-order delay filter. Then, in a state where the estimated actual oil pressure Pes that changes every moment according to the disengagement instruction pressure Prel is calculated by the calculation unit 7a1, the setting unit 7a3 sets the estimated actual oil pressure Pes at the time t4, at which the determination unit 7a2 determines that the predetermined reference slip amount As occurs in the brake B1, as the disengagement instruction pressure Prel.

Accordingly, the disengagement instruction pressure Prel coincides with the estimated actual oil pressure Pes at the time t4, the slip amount A (i.e., the reference slip amount As) that occurs in the brake B1 at the time t4 can be appropriately maintained, and the input shaft rotation number Nt of the input shaft 2a can be smoothly changed from the rotation number corresponding to the second speed before the speed change to the rotation number corresponding to the first speed after the speed change. Therefore, the speed change processing unit 7a can perform the speed change (downshift) smoothly.

Figure 8:
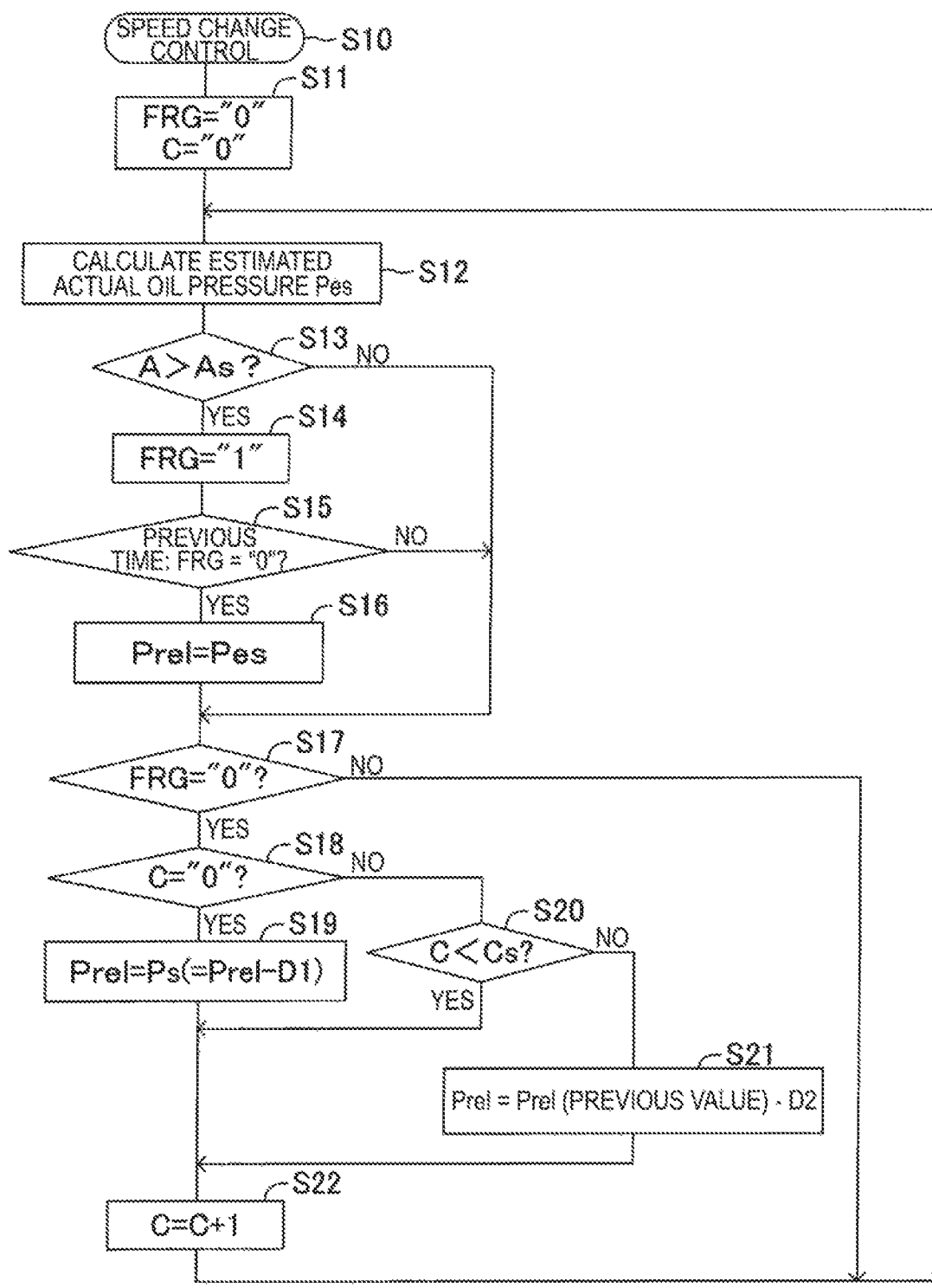
FIG. 8 is a flowchart showing a speed change control program executed by the speed change machine control device (oil pressure control device) of FIG. 1.

Here, coast down speed change control performed by the speed change processing unit 7a will be described in more detail. In a case where the coast down speed change is performed, the speed change processing unit 7a (more specifically, CPU, hereinafter the same) executes a speed change control program shown in FIG. 8. Also in the following description, a case where the coast down speed change is downshifted from the second speed to the first speed will be explained as an example.

The speed change processing unit 7a starts execution of the speed change control program in step S10, and sets a value of a slip start determination flag FRG to "0" in the following step S11, the value of the slip start determination flag FRG indicating that the predetermined reference slip amount As occurs in the brake B1 in the intermediate state, the "0" indicating that the reference slip amount As does not occur. The speed change processing unit 7a sets a value of a control execution counter C to "0", the value of the control execution counter C indicating the number of control execution that decreases the disengagement instruction pressure Prel in a state where the value of the slip start determination flag FRG is set to "0". When the value of the slip start determination flag FRG and the value of the control execution counter C are set to "0" by the speed change processing unit 7a, the program proceeds to step S12.

In step S12, the speed change processing unit 7a (the calculation unit 7a1) calculates the estimated actual oil pressure Pes by using the first-order delay filter according to Equation 1. The calculation unit 7a1 outputs the calculated estimated actual oil pressure Pes to the storage unit 7b. The storage unit 7b temporarily stores the calculated estimated actual oil pressure Pes. When the estimated actual oil pressure Pes is calculated and stored by the speed change processing unit 7a (the calculation unit 7a1 and the storage unit 7b), the program proceeds to step S13.

In step S13, the speed change processing unit 7a (the determination unit 7a2) determines whether the predetermined reference slip amount As occurs in the brake B1 that is the friction engagement element. That is, if the slip amount A (=Nt−(No×r)) of the brake B1 is greater than the slip determination rotation number Ns, the determination unit 7a2 determines "Yes" since the predetermined reference slip amount As occurs in the brake B1. Thereafter, the program proceeds to step S14. On the other hand, if the slip amount A (=Nt−(No×r)) of the brake B1 is less than or equal to the slip determination rotation number Ns, the determination unit 7a2 determines "No" since the predetermined reference slip amount As does not occur in the brake B1. Thereafter, the program proceeds to step S17.

In step S14, the speed change processing unit 7a sets the value of the slip start determination flag FRG to "1", the "1" indicating that the predetermined reference slip amount As occurs in the brake B1. Thereafter, the program proceeds to step S15. In step S15, regarding the value of the slip start determination flag FRG, the speed change processing unit 7a determines whether the value (previous value) of the slip start determination flag FRG at the time of previous program execution is "0". That is, if the previous value of the slip start determination flag FRG is "0", and the value of the slip start determination flag FRG at the current program execution is set to "1", the speed change processing unit 7a determines "Yes". Thereafter, the program proceeds to step S16. On the other hand, if the previous value of the slip start determination flag FRG is "1", the speed change processing unit 7a determines "No". Thereafter, the program proceeds to step S17.

In step S16, the speed change processing unit 7a (the setting unit 7a3) sets the estimated actual oil pressure Pes calculated and stored in step S12 to the disengagement instruction pressure Prel. That is, a situation where step processing of step S16 is executed occurs at the time t4 shown in FIG. 7. Therefore, in order to make the estimated actual oil pressure Pes coincide with the disengagement instruction pressure Prel in the brake B1 at the time t4, the speed change processing unit 7a (the setting unit 7a3) sets the estimated actual oil pressure Pes to the disengagement instruction pressure Prel. Thereafter, the program proceeds to step S17.

In step S17, the speed change processing unit 7a determines whether the value of the slip start determination flag FRG is "0". That is, if the value of the slip start determination flag FRG is "0", the speed change processing unit 7a determines "Yes". Thereafter, the program proceeds to step S18. On the other hand, if the value of the slip start determination flag FRG is "1", the speed change processing unit 7a determines "No". Thereafter, the program returns to step S12, and each step processing after step S12 is performed.

In step S18, the speed change processing unit 7a determines whether the value of the control execution counter C is "0". That is, if the value of the control execution counter C is "0", the speed change processing unit 7a determines "Yes". Thereafter, the program proceeds to step S19. In step S19, the speed change processing unit 7a (the setting unit 7a3) sets the standby instruction pressure Ps, which is obtained by reducing only by the first pressure reduction amount D1 from the disengagement instruction pressure Prel (i.e., the same as the engagement instruction pressure Peng) in the brake B1 in the engagement state, to the disengagement instruction pressure Prel as shown in FIG. 7. When the standby instruction pressure Ps is set to the disengagement instruction pressure Prel by the speed change processing unit 7a (the setting unit 7a3), the program proceeds to step S22.

Returning to FIG. 8, if the value of the control execution counter C is not "0" and the counting continues (if time elapses since the control starts), the speed change processing unit 7a determines "No". Thereafter, the program proceeds to step S20. In step S20, the speed change processing unit 7a determines whether the value (elapsed time) of the control execution counter C is less than a preset standby time Cs. That is, if the value (the elapsed time) of the control execution counter C is less than the standby time Cs, the speed change processing unit 7a determines "Yes". Thereafter, the program proceeds to step S22. A situation where "Yes" is determined in determination step processing in step S20 occurs between time t1 and time t2 shown in FIG. 7, during which the speed change processing unit 7a maintains the standby instruction pressure Ps.

Returning to FIG. 8 again, if the value (the elapsed time) of the control execution counter C is greater than or equal to the standby time Cs, the speed change processing unit 7a determines "No". Thereafter, the program proceeds to step S21. In step S21, the speed change processing unit 7a (the setting unit 7a3) sets a value, which is obtained by subtracting the preset second pressure reduction amount D2 from the value (the previous value) of the disengagement instruction pressure Prel (or the standby instruction pressure Ps) set in step S21 during the previous program execution, as the disengagement instruction pressure Prel. When the disengagement instruction pressure Prel is set by the speed change processing unit 7a, the program proceeds to step S22. Further, a situation where the disengagement instruction pressure Prel is set during step processing in step S21 is a situation where the standby instruction pressure Ps is gradually decreased (at a predetermined speed) by the second pressure reduction amount D2 between the time t2 and time t3 shown in FIG. 7.

In step S22, the speed change processing unit 7a increases the value of the control execution counter C only by, for example, "1". Then, when the value of the control execution counter C is increased by the speed change processing unit 7a, the program returns to step S12, and each step processing after step S12 is repeatedly executed.

As can be understood from the above description, the speed change machine control device 7 according to the above embodiment is applied to the oil pressure device for controlling oil pressure supplied from the oil pressure circuit 8 to the clutches C1 to C3 and the brakes B1 and B2. The oil pressure device includes: the input shaft 2a; the output shaft 2b; the clutches C1 to C3 and the brakes B1 and B2 serving as the friction engagement elements that are disposed between the input shaft 2a and the output shaft 2b, enable transmission of the rotational power, which is input from the engine 1 as the power source to the input shaft 2a, to the output shaft 2b by being in the engagement state, and to block transmission of the rotational power to the output shaft 2b by being in the disengagement state; and the oil pressure circuit 8 that supplies the oil pressure with respect to the clutches C1 to C3, and the brakes B1 and B2, in which the clutches C1 to C3 and the bakes B1 and B2 are capable of transiting between the engagement state and the disengagement state by the oil pressure supplied from the oil pressure circuit 8. The speed change machine control device 7 includes: the calculation unit 7a1 that calculates and estimates the first-order delay filter including the time constant $T_{oil}$ that is the delay of the actual oil pressure Pj actually supplied from the oil pressure circuit 8 to the brake B1 with respect to the disengagement instruction pressure Prel that is the instruction pressure which instructs the oil pressure to be supplied from the oil pressure circuit 8 to the brake B1 that is the friction engagement element so as to put the brake B1 in the disengagement state, and calculates the estimated actual oil pressure Pes obtained by taking the estimated delay of the actual oil pressure Pj into consideration using the first-order delay filter; the determination unit 7a2 that determines whether the slip amount A that occurs in the brake B1 in the intermediate state between the engagement state and the disengagement state reaches the predetermined reference slip amount As so as to enable relative rotation between the input shaft 2a and the output shaft 2b; and the setting unit 7a3 that sets the estimated actual oil pressure Pes calculated by the calculation unit 7a1 as the disengagement instruction pressure Prel when the determination unit 7a2 determines that the slip amount A reaches the reference slip amount As (the time t4).

In this case, the oil pressure device is an automatic transmission 2 that includes the plurality of friction engagement elements including the lock-up clutch LU, the clutches C1 to C3, and the brakes B1 and B2, and the torque converter 20 that is the fluid transmission device disposed between the engine 1 and the input shaft 2a; and outputs the rotational power, which is input from the engine 1 to the input shaft 2a via the torque converter 20, to the drive wheels 4 and 5 via the output shaft 2b by selectively putting the lock-up clutch LU, the clutches C1 to C3, the brakes B1 and B2 in the engagement state or the disengagement state.

Accordingly, the estimated actual oil pressure Pes obtained by taking the delay of the actual oil pressure Pj into consideration can be calculated by using the first-order delay filter, and the estimated actual oil pressure Pes at the time (the time t4) when the reference slip amount As occurs in the brake B1 can be set as the disengagement instruction pressure Prel. Therefore, since the disengagement instruction pressure Prel at the time when the reference slip amount As occurs can coincide with the estimated actual oil pressure Pes corresponding to the actual oil pressure Pj in the brake B1 in an extremely easy manner, overshooting of the estimated actual oil pressure Pes with respect to the disengagement instruction pressure Prel can be prevented. Therefore, it is possible to prevent occurrence of heat generation accompanying with unnecessary friction in the brake B1, to prevent repetition of the disengagement and re-engagement of the brake B1, and to prevent occurrence of unnecessary shock accompanying with the speed change.

In the automatic transmission 2, it is desired that the clutches C1 to C3 and the brakes B1 and B2 appropriately keep the slip amount A (the reference slip amount As) constant at the time of speed change. In this regard, a state where the reference slip amount As occurs can be reliably maintained by setting the estimated actual oil pressure Pes at the time when the reference slip amount As occurs to the disengagement instruction pressure Prel. Therefore, since the reference slip amount As is appropriately maintained in the automatic transmission 2 as the oil pressure device, a shock accompanying with the speed change can be prevented.

In these cases, the calculation unit 7a1 can calculate the delay of the actual oil pressure Pj (the time constant $T_{oil}$) by using the transmission function (first-order delay filter) that sets a target rotation number of the turbine runner 22 in the torque converter 20 integrally rotating with the input shaft 2a as the control input, sets the input shaft rotation number Nt that is the rotation number of the turbine runner 22 in the torque converter 20 integrally rotating with the input shaft 2a as the control amount, and sets the value proportional to the deviation between the target rotation number and the input shaft rotation number Nt as the disengagement instruction pressure Prel.

Accordingly, the calculation unit 7a1 can calculate the delay of the actual oil pressure Pj (the time constant $T_{oil}$) by using the input shaft rotation number Nt that is a physical quantity which can be measured extremely easily. Therefore, even when it is difficult to measure the actual oil pressure Pj, the calculation unit 7a1 can calculate the estimated actual oil pressure Pes in the brake B1 that is the friction engagement element and accurately estimate the actual oil pressure Pj by using the transmission function (the first-order delay filter) representing the delay of the actual oil pressure Pj (the time constant $T_{oil}$).

First Modification

In the above embodiment, in a case of downshift speed change (coast down speed change) during deceleration coasting in a state where an accelerator pedal is not depressed, the speed change processing unit 7a sets the estimated actual oil pressure Pes at a time t4 shown in FIG. 7, that is, a time when the predetermined reference slip amount As occurs, to the disengagement instruction pressure Prel. When the accelerator pedal is depressed during the coast down speed change, as shown in FIG. 9, the input shaft rotation number Nt of the input shaft 2a increases, the so-called racing may occur, and shock accompanying with speed change may be generated.

Meanwhile, in a case where the estimated actual oil pressure Pes can be calculated by using the first-order delay filter and the estimated actual oil pressure Pes at the time when the predetermined reference slip amount As occurs can be set to the disengagement instruction pressure Prel as in the above embodiment, shock accompanying with the speed change can be reduced even when the accelerator pedal is depressed during the speed change. Hereinafter, the first modification is described. The same parts as those in the above embodiment are denoted by the same reference numerals, and the description thereof is omitted.

Figure 9:
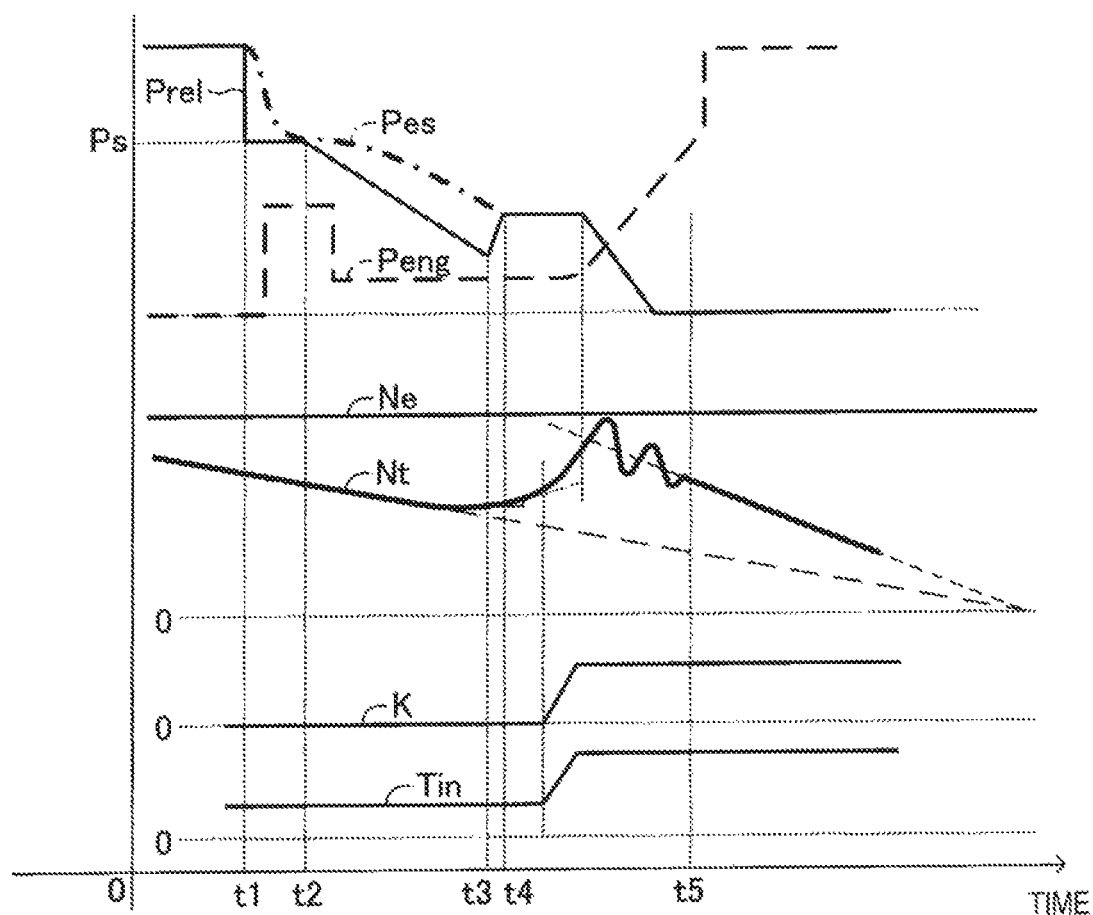
FIG. 9 is a time chart schematically showing operations of the vehicle in a first modification.

In a case where the accelerator pedal is depressed during the coast down speed change, as shown in FIG. 9, as the throttle opening degree K increases, an input torque Tin input to the input shaft 2a, that is, the automatic transmission 2, increases, and the input shaft rotation number Nt of the input shaft 2a increases. Therefore, in this state, since the input torque Tin in Equation 2 increases, the input shaft rotation number Nt oscillates and shock occurs during the speed change as shown in FIG. 9.

In this case, as apparent from Equation 6, the input shaft rotation number Nt can be changed with the same rotational acceleration ΔNt as before the accelerator pedal is depressed by compensating an increment of the input torque Tin by adding the transmission torque Trel calculated from the disengagement instruction pressure Prel with respect to the brake B1 according to Equation 2. Therefore, during the coast down speed change, particularly in a case where the reference slip amount As occurs in the brake B1, shock during the speed change can be prevented even when the accelerator pedal is depressed.

Figure 10:
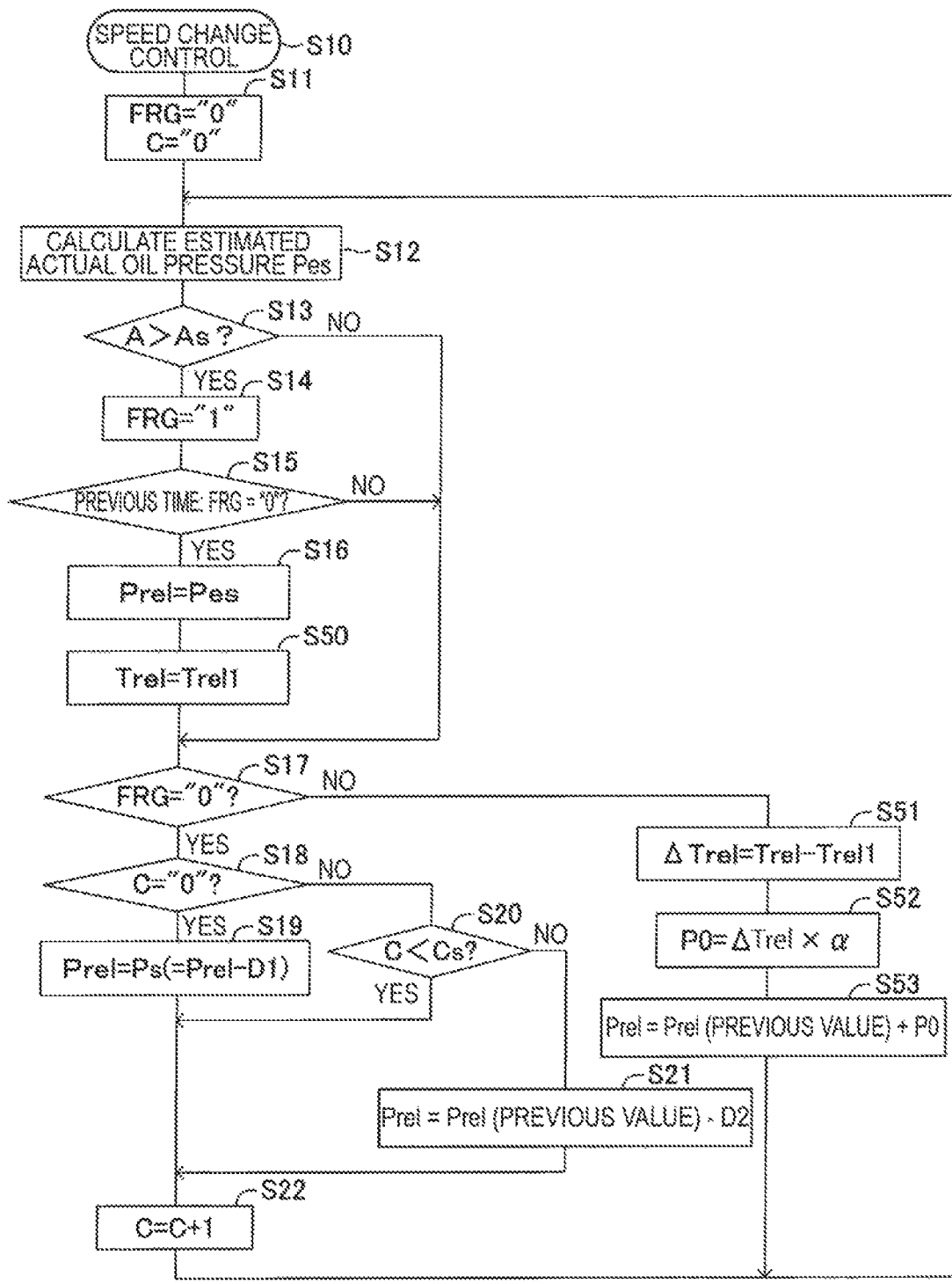
FIG. 10 is a flowchart showing a speed change control program executed by the speed change machine control device (oil pressure control device) of FIG. 1 according to the first modification.

In the first modification, the speed change processing unit 7a executes a speed change control program shown in FIG. 10 in which increase of the transmission torque Trel as described above is taken into consideration. Here, the speed change control program shown in FIG. 10 is different only in that step S50, step S51, step S52, and step S53 are added as compared with the speed change control program in FIG. 8 executed by the speed change processing unit 7a in the above embodiment. Therefore, in the following description, each step processing of steps S50 to S53 added as the first modification is described in detail.

The speed change processing unit 7a sets a value of the slip start determination flag FRG to "1" according to execution of the current program in determination processing in step S15, and sets the estimated actual oil pressure Pes as the disengagement instruction pressure Prel in the subsequent step S16. Thereafter, the program proceeds to step S50. In step S50, the speed change processing unit 7a (the calculation unit 7a1) calculates, for example, transmission torque Trel1 at the time when the predetermined reference slip amount As occurs in the brake B1 from the disengagement instruction pressure Prel (the estimated actual oil pressure Pes) set in step S16.

Then, the speed change processing unit 7a (the calculation unit 7a1) stores the calculated transmission torque Trel1 in the storage unit 7b. Thereafter, the program proceeds to step S17. If the value of the slip start determination flag FRG is "1" in step S17, that is, for example, if the predetermined reference slip amount As occurs in the brake B1, the speed change processing unit 7a determines "No". Thereafter, each step processing after step S51 is executed.

In step S51, the speed change processing unit 7a (the calculation unit 7a1) calculates an increase amount ΔTrel of the transmission torque Trel1. Specifically, the calculation unit 7a1 calculates, the increase amount ΔTrel by subtracting the transmission torque Trel1 at the time when the predetermined reference slip amount As occurs and is stored in the storage unit 7b in step S50, from the transmission torque Trel calculated from the disengagement instruction pressure Prel according to current execution of the program. When the increase amount ΔTrel is calculated by the speed change processing unit 7a, the program proceeds to step S52.

In step S52, the speed change processing unit 7a (the calculation unit 7a1) calculates an oil pressure increase amount P0 corresponding to the increase amount ΔTrel. Specifically, the speed change processing unit 7a (the calculation unit 7a1) multiplies the increase amount ΔTrel by a predetermined torque oil pressure conversion coefficient α, thereby calculating the oil pressure increase amount P0 (=ΔTrel×α). When the oil pressure increase amount P0 is calculated by the speed change processing unit 7a (the calculation unit 7a1), the program proceeds to step S53.

In step S53, the speed change processing unit 7a (the setting unit 7a3) sets the disengagement instruction pressure Prel by taking the oil pressure increase amount P0 calculated in step S52 into consideration. That is, the speed change processing unit 7a (the setting unit 7a3) sets the current disengagement instruction pressure Prel by adding the oil pressure increase amount P0 calculated in step S52 to the previous disengagement instruction pressure Prel set at the time of the previous program execution (including the disengagement instruction pressure Prel set in step S16). Accordingly, especially in a case where the accelerator pedal is depressed in a state where the predetermined reference slip amount As occurs in the friction engagement element (e.g., the brake B1), the disengagement instruction pressure Prel can be set by taking into consideration the oil pressure increase amount P0 based on the transmission torque Trel that is increased as the accelerator pedal is depressed. Then, the speed change processing unit 7a generates the disengagement instruction pressure Prel in a solenoid valve in the oil pressure circuit 8.

Therefore, the input shaft rotation number Nt of the input shaft 2a (the turbine runner 22) changes with the same rotational acceleration ΔNt as before the accelerator pedal is depressed by causing the friction engagement element (e.g., the brake B1) to operate corresponding to the disengagement instruction pressure Prel obtained by taking the oil pressure increase amount P0 into consideration. Therefore, in the first modification, in addition to effects of the above embodiment, it is possible to prevent racing in a case where the accelerator pedal is depressed and to effectively reduce a shock during the speed change.

Second Modification

In the first modification, even when an accelerator pedal is depressed in coast down speed change, in order to reduce a shock accompanying with speed change, the estimated actual oil pressure Pes is calculated, and the disengagement instruction pressure Prel obtained by taking the oil pressure increase amount P0 into consideration is set to the estimated actual oil pressure Pes. In this case, in a case where a response delay of the actual oil pressure Pj (the estimated actual oil pressure Pes) with respect to an instruction pressure (e.g., the disengagement instruction pressure Prel) is large (a time constant $T_{oil}$ is large) with respect to a response to the input torque Tin input from the engine 1 to the automatic transmission 2, a shock may occur during the speed change due to difference in responsiveness.

Therefore, in the second modification, especially in a case where the time constant $T_{oil}$ calculated by Equation 10 is large, the responsiveness can be made uniform by requesting the engine control device 6 to decrease torque by using a first-order delay filter equivalent to the first-order delay filter represented by Equation 1 for the input torque Tin input from the engine 1 to the automatic transmission 2. Accordingly, it is possible to reduce a shock that occurs during the speed change due to the difference in the responsiveness. Hereinafter, the second modification is described. The same parts as those in the above embodiment and the first modification are denoted by the same reference numerals, and the description thereof is omitted.

Figure 11:
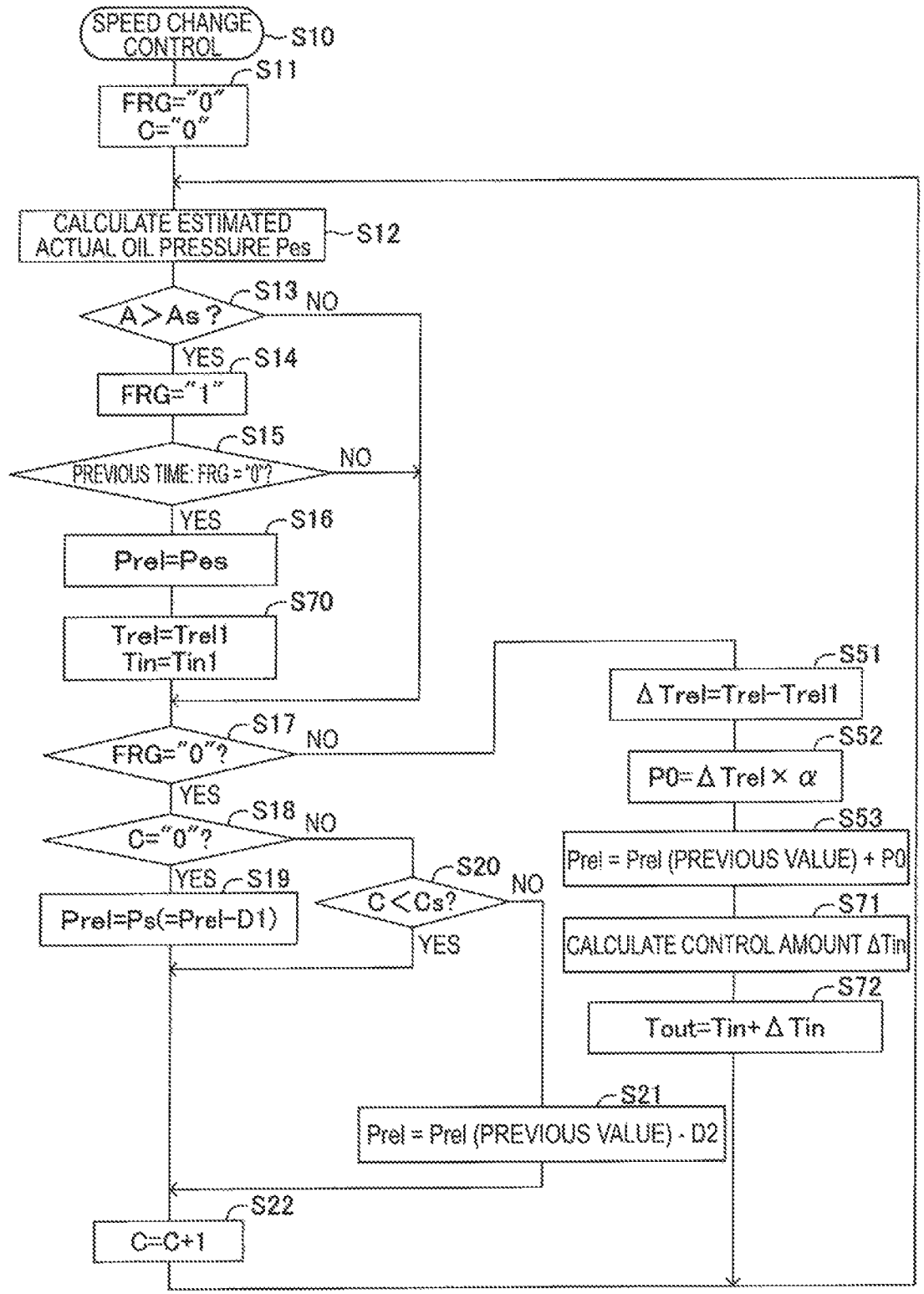
FIG. 11 is a flowchart showing a speed change control program executed by the speed change machine control device (oil pressure control device) of FIG. 1 according to a second modification.

As described in the first modification, in a case where the accelerator pedal is depressed during the coast down speed change, as shown in FIG. 9, the input torque Tin input from the engine 1 to the automatic transmission 2 increases as the throttle opening degree K increases. Therefore, in the second modification, the speed change processing unit 7a sets the disengagement instruction pressure Prel by increasing the transmission torque Trel in the same manner as in the first modification, that is, by taking the oil pressure increase amount P0 into consideration, and executes a speed change control program shown in FIG. 11 in which the input torque Tin input from the engine 1 corresponds to an oil pressure response delay in the automatic transmission 2. Here, the speed change control program shown in FIG. 11 is different only in that step S70 is provided to replace step S50 and step S71 and step S72 are added, as compared with the speed change control program of FIG. 10 executed by the speed change processing unit 7a in the first modification. Therefore, in the following description, each step processing of steps S70 to S72 added as the second modification is described in detail.

The speed change processing unit 7a sets a value of the slip start determination flag FRG to "1" according to execution of the current program by determination processing in step S15, and sets the estimated actual oil pressure Pes as the disengagement instruction pressure Prel in the subsequent step S16. Thereafter, the program proceeds to step S70. In step S70, the speed change processing unit 7a (the calculation unit 7a1) calculates, for example, in the same manner as in the first modification, the transmission torque Trel1 at the time when the predetermined reference slip amount As occurs in the brake B1 from the disengagement instruction pressure Prel (the estimated actual oil pressure Pes) set in step S16. In addition, the speed change processing unit 7a (the calculation unit 7a1) calculates, for example, input torque Tin1 input from the engine 1 to the automatic transmission 2 (the input shaft 2a and the turbine runner 22) at the time when the predetermined reference slip amount As occurs in the brake B1 according to, for example, Equation 2.

Then, the speed change processing unit 7a (the calculation unit 7a1) stores the calculated transmission torque Trel1 and the input torque Tin1 in the storage unit 7b. Thereafter, the program proceeds to step S17. If the value of the slip start determination flag FRG is "1" in step S17, that is, for example, if the predetermined reference slip amount As occurs in the brake B1, the speed change processing unit 7a determines "No". Thereafter, each step processing after step S51 is executed.

When the disengagement instruction pressure Prel is set by the speed change processing unit 7a (the setting unit 7a3) by taking into consideration the oil pressure increase amount P0 in step S53, the program proceeds to step S71. When the disengagement instruction pressure Prel is set, the speed change processing unit 7a generates the set disengagement instruction pressure Prel in a solenoid valve in the oil pressure circuit 8.

In step S71, the speed change processing unit 7a (the calculation unit 7a1) calculates a control amount Tin of the input torque Tin input from the engine 1. Specifically, the calculation unit 7a1 calculates the increase amount ΔTin1 by subtracting the input torque Tin1 at the time when the predetermined reference slip amount As occurs and is stored in the storage unit 7b in step S70 from the calculated input torque Tin according to the execution of the current program. Then, the calculation unit 7a1 calculates a control amount Tin by applying a first-order delay filter that is equal to the first-order delay filter (right side of Equation 1) represented by the equation 1 to the calculated increase amount ΔTin1. When the control amount Tin is calculated in this manner by the speed change processing unit 7a (the calculation unit 7a1), the program proceeds to step S72.

In step S72, the speed change processing unit 7a (the calculation unit 7a1) calculates required torque Tout (i.e., corresponding to the input torque Tin) that requests output from the engine control device 6 (i.e., the engine 1). Specifically, the calculation unit 7a1 calculates the required torque Tout by adding the control amount ΔTin to which the first-order delay filter is applied in step S71 to the input torque Tin1 at the time when the predetermined reference slip amount As occurs and is stored in the storage unit 7b in step S70. Then, the calculation unit 7a1 of the speed change processing unit 7a outputs the calculated required torque Tout to the engine control device 6.

Figure 12:
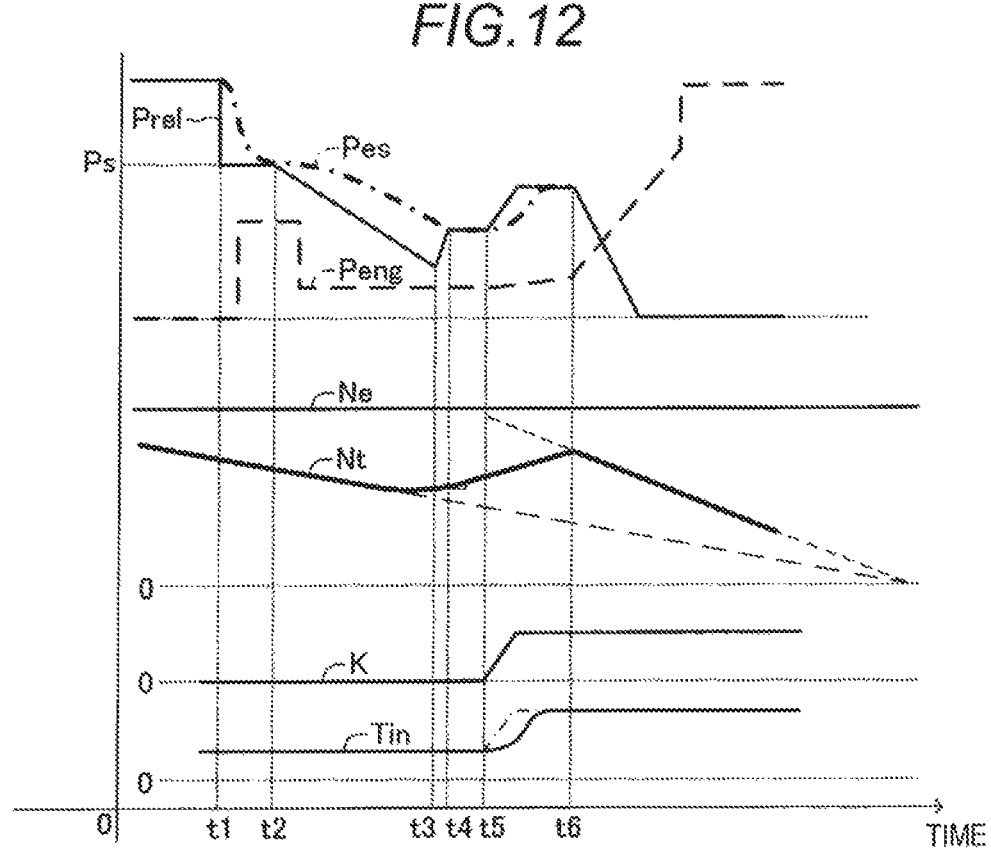
FIG. 12 is a time chart schematically showing operations of the vehicle according to the second modification.

When the required torque Tout is input from the speed change processing unit 7a (the calculation unit 7a1) of the speed change machine control device 7, the engine control device 6 outputs torque according to the required torque Tout, that is, the input torque Tin to the automatic transmission 2. Accordingly, as shown in FIG. 12, as the throttle opening degree K increases from 0% at a time t5, the input torque Tin output from the engine 1 and input to the automatic transmission 2 generates a response delay and increases as compared with the case where the first-order delay filter indicated by a one-dot chain line is not applied. Therefore, responsiveness of the input torque Tin input from the engine 1 approaches responsiveness of the estimated actual oil pressure Pes that occurs in response to the disengagement instruction pressure Prel in the friction engagement element (e.g., the brake B1) of the automatic transmission 2.

Accordingly, in the second modification, in a case where the input torque Tin which is a rotational power input from the engine 1 to the input shaft 2a increases after the slip amount A in the brake B1 reaches the reference slip amount As, the calculation unit 7a1 can request the engine 1 to input the increased input torque Tin to the input shaft 2a with a delay coincide with a delay of the actual oil pressure Pj (the time constant $T_{oil}$). Therefore, the input torque Tin from the engine 1 can correspond to the oil pressure response delay in the automatic transmission 2. Accordingly, it is possible to effectively reduce a shock that occurs during the speed change due to the difference in the responsiveness even when the response delay of the actual oil pressure Pj (the estimated actual oil pressure Pes) with respect to the instruction pressure (e.g., the disengagement instruction pressure Prel) is large (the time constant $T_{oil}$ is large) with respect to the response of the input torque Tin input from the engine 1 to the automatic transmission 2.

The implementation of the present invention is not limited to the embodiment and each of the modifications described above, and various modifications can be made without departing from the object disclosed here.

Figure 13:
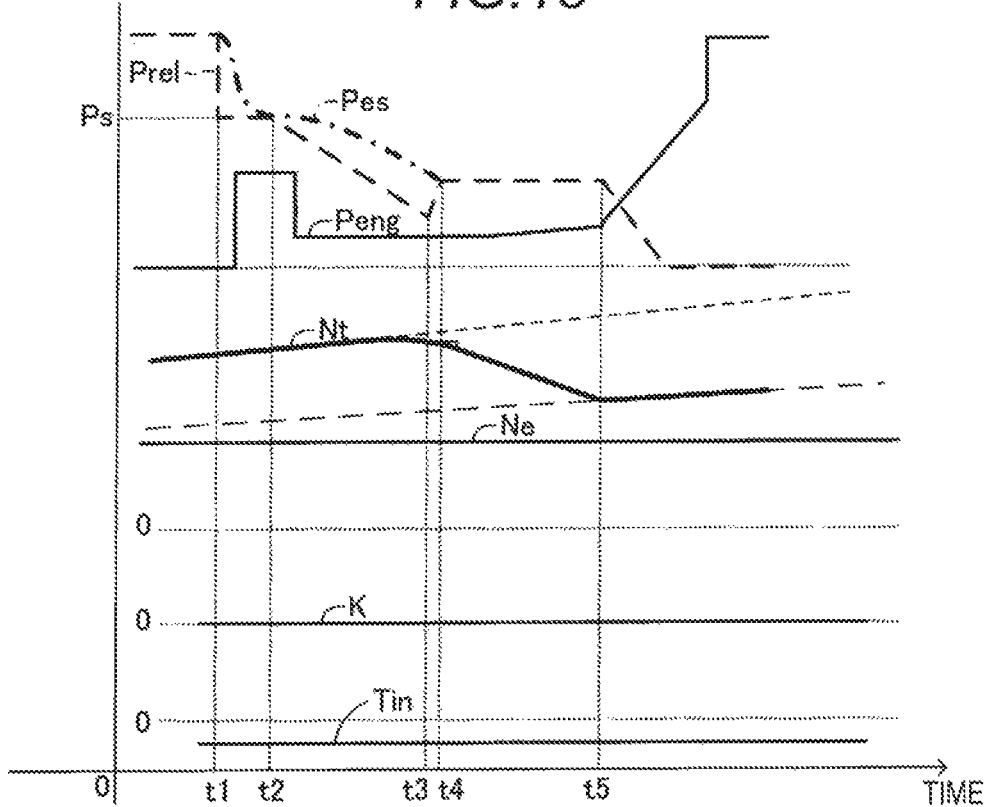
FIG. 13 is a time chart schematically showing operations of the vehicle during upshift according to other modifications.

For example, in the embodiment and each of the modifications described above, the control processing performed at the time when the coast down speed change from the second speed to the first speed, that is, the downshift speed change during the deceleration coasting in a state where the accelerator pedal is not depressed is exemplified. Alternatively, when the upshift speed change is performed, the speed change processing unit 7a of the speed change machine control device 7 executes the speed change control program of the embodiment and each of the modifications described above to set the estimated actual oil pressure Pes to the disengagement instruction pressure Prel, thereby obtaining the same effects as those of the embodiment and each of the modifications described above. In a case of upshift speed change, as shown in FIG. 13, although the input torque Tin is a negative value, the speed change processing unit 7a can set the estimated actual oil pressure Pes to the disengagement instruction pressure Prel.

It is assumed that the coast down speed change is performed during the deceleration coasting in the embodiment and each of the modifications described above. However, even in situations that the downshift speed change is performed during normal traveling or a driver performs the downshift speed change by manual operation, the speed change processing unit 7a can calculate the estimated actual oil pressure Pes accurately according to Equations 1 and 10, and therefore the same effects as those of the embodiment and each of the modifications described above can be expected even in these situations.

Further, in the embodiment and each of the modifications described above, the automatic transmission 2 is used as the oil pressure device. Alternatively, other oil pressure devices (different device having wet clutch, or a power transmission device in a hybrid vehicle, etc.) may also be used as the oil pressure device as long as the input shaft, the output shaft, the friction engagement element, and the oil pressure circuit are included.

An oil pressure control device according to an aspect of this disclosure, which is applied to an oil pressure device for controlling oil pressure supplied from an oil pressure circuit to a friction engagement element. The oil pressure device includes: an input shaft; an output shaft; the friction engagement element disposed between the input shaft and the output shaft, and configured to enable transmission of rotational power, which is input from a power source to the input shaft, to the output shaft by being in an engagement state, and to block the transmission of the rotational power to the output shaft by being in a disengagement state; and the oil pressure circuit configured to supply the oil pressure to the friction engagement element, in which the friction engagement element is capable of transiting between the engagement state and the disengagement state by the oil pressure supplied from the oil pressure circuit. The oil pressure control device includes: a calculation unit configured to calculate and estimate a delay of an actual oil pressure actually supplied from the oil pressure circuit to the friction engagement element with respect to an instruction pressure that instructs the oil pressure to be supplied from the oil pressure circuit to the friction engagement element, and to calculate an estimated actual oil pressure obtained by taking the estimated delay of the actual oil pressure into consideration; a determination unit configured to determine whether a slip amount that occurs in the friction engagement element in an intermediate state between the engagement state and the disengagement state reaches a predetermined reference slip amount so as to enable relative rotation between the input shaft and the output shaft; and a setting unit configured to set the estimated actual oil pressure calculated by the calculation unit as the instruction pressure when the determination unit determines that the slip amount reaches the reference slip amount.

With this configuration, it is possible to calculate the estimated actual oil pressure obtained by taking the delay of the actual oil pressure into consideration, and set the estimated actual oil pressure as the instruction pressure when the reference slip amount occurs in the friction engagement element. The instruction pressure at the time when the reference slip amount occurs coincides with the estimated actual oil pressure corresponding to the actual oil pressure in the friction engagement element extremely easily, so that overshoot of the estimated actual oil pressure with respect to the instruction pressure can be prevented.

In the oil pressure control device according to the aspect of this disclosure, the calculation unit may be configured to calculate the delay of the actual oil pressure by using a transmission function in which a target rotation number of the input shaft is set as a control input, a rotation number of the input shaft is set as a control amount, and a value proportional to a deviation between the target rotation number and the rotation number is set as the instruction pressure.

In the oil pressure control device according to the aspect of this disclosure, in a case where the rotational power input from the power source to the input shaft increases after the slip amount in the friction engagement element reaches the reference slip amount, the calculation unit may request the power source to input the increased rotational power to the input shaft with a delay that coincides with the delay of the actual oil pressure.

In the oil pressure control device according to the aspect of this disclosure, the oil pressure device may be an automatic transmission for a vehicle that includes a plurality of the friction engagement elements, and a fluid transmission device disposed between the power source and the input shaft, and the rotational power, which is input from the power source to the input shaft via the fluid transmission device, may be output to a drive wheel via the output shaft by selectively putting the plurality of the friction engagement elements in the engagement state or the disengagement state.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An oil pressure control device applied to an oil pressure device for controlling oil pressure supplied from an oil pressure circuit to a friction engagement element,
    the oil pressure device including:
        an input shaft;
        an output shaft;
        the friction engagement element disposed between the input shaft and the output shaft, and configured to enable transmission of rotational power, which is input from a power source to the input shaft, to the output shaft by being in an engagement state, and to block the transmission of the rotational power to the output shaft by being in a disengagement state; and
        the oil pressure circuit configured to supply the oil pressure to the friction engagement element,
        the friction engagement element being capable of transitioning between the engagement state and the disengagement state by the oil pressure supplied from the oil pressure circuit,
    the oil pressure control device comprising:
        a calculation unit configured to estimate a delay of an actual oil pressure actually supplied from the oil pressure circuit to the friction engagement element with respect to an instruction pressure that instructs the oil pressure to be supplied from the oil pressure circuit to the friction engagement element, and to calculate an estimated actual oil pressure obtained by taking the estimated delay of the actual oil pressure into consideration;
        a determination unit configured to determine whether a slip amount that occurs in the friction engagement element in an intermediate state between the engagement state and the disengagement state reaches a predetermined reference slip amount so as to enable relative rotation between the input shaft and the output shaft; and
        a setting unit configured to set the estimated actual oil pressure calculated by the calculation unit as the instruction pressure when the determination unit determines that the slip amount reaches the reference slip amount.

2. The oil pressure control device according to claim 1, wherein the calculation unit is configured to calculate the delay of the actual oil pressure by using a transmission function that in which a target rotation number of the input shaft is set as a control input, a rotation number of the input shaft is set as a control amount, and a value proportional to a deviation between the target rotation number and the rotation number is set as the instruction pressure.

3. The oil pressure control device according to claim 1, wherein in a case where the rotational power input from the power source to the input shaft increases after the slip amount in the friction engagement element reaches the reference slip amount, the calculation unit request the power source to input the increased rotational power to the input shaft with a delay that coincides with the delay of the actual oil pressure.

4. The oil pressure control device according to claim 1, wherein the oil pressure device is an automatic transmission for a vehicle that includes:
a plurality of friction engagement elements, including the friction engagement element; and
a fluid transmission device disposed between the power source and the input shaft,
wherein the rotational power, which is input from the power source to the input shaft via the fluid transmission device, is output to a drive wheel via the output shaft by respectively selectively putting the plurality of the friction engagement elements in the engagement state or the disengagement state.

* * * * *